UNITED STATES PATENT OFFICE 2,414,576

PROCESS FOR THE PREPARATION OF PENTAERYTHRITOL PRODUCTS

Joseph A. Wyler, Allentown, Pa., assignor to Trojan Powder Company, Allentown, Pa.

No Drawing. Application October 30, 1945, Serial No. 625,696

6 Claims. (Cl. 260—637)

This invention relates in general to the preparation of polyhydroxy materials and particularly to the preparation of pentaerythritol-containing products.

It is well known that formaldehyde and acetaldehyde react in aqueous alkaline media to form pentaerythritol and that the formate ion is simultaneously produced. The general, over-all chemical reaction involved may be written:

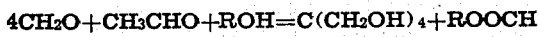

where, R is a mono-valent metal or half of a divalent metal.

The chemical changes involving formaldehyde and acetaldehyde under the conditions usually employed also produce other materials as dipentaerythritol, tripentaerythritol, tetrapentaerythritol, pentapentaerythritol and other polyhydroxy materials, including those of a syrupy nature.

In order to convey a clearer impression of the nature of the products formed during the alkaline condensation of $CH_2O$ and $CH_3CHO$ the following example, in which all parts are by weight, is given:

Example

About 1900 parts of water are charged into a suitable reaction kettle provided with a stirrer. To this is added about 155 parts of hydrated lime followed by a mixture consisting of 125 parts of acetaldehyde, 1400 parts of 23% formaldehyde and 425 parts of water. The latter mixture is added over a period of about 2 hours, maintaining the temperature of the reaction at about 30° C.

The whole mixture is stirred until an iodine titration indicates the presence of, say, about 0.10% $CH_2O$ in the mixture, when it is filtered to separate the insoluble impurities as $Ca(OH)_2$, $CaCO_3$, $Al(OH)_3$, $Fe(OH)_3$, $Mg(OH)_2$, etc., and to furnish a clear solution containing pentaerythritol, dipentaerythritol, etc., as mentioned above. This solution may be used as the starting material in my process.

The details of the process just described are not part of the present invention, but are given to convey a clearer picture of the nature of the commercial processes for the preparation of pentaerythritols and of the nature of the pentaerythritol solutions started with in my process.

In general, it can be said that present commercial processes for the preparation of pentaerythritol are based upon the reaction of one molecule of acetaldehyde with about four molecules of formaldehyde in aqueous alkaline media at temperatures of about 20° C. to 50° C. and in such a volume of water as to provide a solution containing less than about 20% of aldehydes at the beginning of the condensation; and in all cases it is necessary to remove the formate and the metallic ions in order to obtain the pentaerythritols and other polyhydroxy materials with sufficient purity for commercial purposes.

If calcium hydroxide is used in the original condensation it is necessary to remove calcium formate. This is usually carried out by means of sulfuric or oxalic acid or both, followed by filtration and a distillation of the formic acid. The latter operation is unsatisfactory when it is desired to recover all the polyhydroxy values.

It is an object of this invention to recover, with highest yields, all the polyhydroxy values obtained in the alkaline condensation of formaldehyde and acetaldehyde. A further object is to provide a short process for recovering these polyhydroxy values. A still further object is to provide a process for the preparation of a pentaerythritol-containing product of usefulness for the preparation of rapidly hardening resins. Other and further objects will become apparent upon a perusal of the following specification and claims.

I have discovered that if the formate radical in the finished condensation reaction described above, is present as ammonium formate that the latter may be completely oxidized to gaseous products by means of hydrogen peroxide, without any significant deleterious effects upon the polyhydroxy materials present in such condensation mixtures and that the resulting mixture upon simple evaporation and drying yields a valuable product high in pentaerythritol with minor amounts of dipentaerythritol, other polypentaerythritols and syrupy polyhydroxy materials, but substantially free from metallic constituents and formate ion.

In accordance with my invention a lime-formaldehyde-acetaldehyde pentaerythritol condensation batch may be treated, without any previous filtration, with ammonia and $CO_2$, or with ammonium carbonate directly, or with any other suitable ammonium salt capable of properly precipitating the Ca ion, in order to convert the calcium formate to ammonium formate. The precipitation mixture is filtered and the filtrate treated with hydrogen peroxide to eliminate the ammonium and formate ions by conversion to $CO_2$, $H_2O$ and $N_2$.

For this purpose a pentaerythritol condensation batch liquor prepared as described in the example is treated with pulverized ammonium carbonate, added a little at a time, until test samples show that the Ca ions have been substantially completely removed. Only a slight excess of ammonium carbonate is needed for this purpose.

The mixture, after thorough stirring, is filtered and treated with an aqueous solution, preferably 30%, of $H_2O_2$ and warmed to about 60° C. The amount of hydrogen peroxide to add is determined by checking test samples of the reaction mixture with the KI—acetic acid—starch test. The mixture is kept hot until the ammonium formate is destroyed and then evaporated to obtain the desired product.

If it is desired to obtain a pentaerythritol of M. P. greater than 250° C. the evaporation is finally carried out above about 75° C. and the crystals separating above this temperature centrifuged in the hot, washed with hot water and dried. The liquor passing thru the centrifuge is evaporated to almost dryness, allowed to cool to solidify, and this solid mass broken up and dried. This latter product contains pentaerythritol, dipentaerythritol, tripentaerythritol, etc., mentioned above.

If it is not desired to obtain the pentaerythritol in a form essentially free from dipentaerythritol but to make a pentaerythritol-containing product in which the various other polyhydroxy materials are associated with this high purity pentaerythritol a much shorter and economical process may be used, that is, the original $H_2O_2$-treated liquor is evaporated to dryness, without any intermediate separation of pentaerythritol. The product thus obtained is particularly useful for the preparation of resins and esters used in lacquers.

It will be apparent that many modifications of my process may be made.

The original liquor obtained in the condensation of the $CH_2O$ and acetaldehyde may be one obtained at any desired stage of the condensation and need not be filtered before adding the ammonium salt used as precipitant. Any excess of $CH_2O$ present in the liquor is oxidized by the $H_2O_2$.

The alkaline condensation agents used in my process are hydroxides of members of the alkaline-earth metal series, i. e., Ca, Ba and Sr, and the preferred agent is $Ca(OH)_2$.

The ammonium salt used as precipitant may be any ammonium salt whose anion forms an insoluble compound with alkaline earth metals. When lime is used as the condensation agent I prefer to use ammonium carbonate; with $Ba(OH)_2$ or $Sr(OH)_2$ I prefer ammonium sulfate.

The precipitation-conversion step of my process may be carried out at any temperature from room temperature to the boiling temperature, although I prefer a temperature of about 60° C.

The evaporation may be carried out at any suitable temperature or pressure. I prefer to use vacuum evaporation and a temperature of about 80° C. For the evaporation step producing the final dry product I prefer to use a vacuum drum or a spray dryer.

I claim:

1. In the process for the preparation of pentaerythritol which comprises reacting formaldehyde and acetaldehyde in aqueous medium in the presence of an hydroxide of an alkaline-earth metal, the combination of steps comprising converting the metal formate formed therein into ammonium formate and precipitating the metal ion from solution, stirring, filtering, warming, adding an excess of $H_2O_2$ to destroy the ammonium formate in the filtrate and recovering the polyhydroxy materials remaining in solution.

2. In the process for the preparation of pentaerythritol which comprises reacting formaldehyde and acetaldehyde in aqueous medium in the presence of an hydroxide of an alkaline-earth metal, the combination of steps comprising adding an ammonium salt whose anion forms an insoluble salt with alkaline-earth metals, stirring, filtering, warming, adding an excess of $H_2O_2$ to destroy the ammonium formate in the filtrate and recovering the polyhydroxy materials remaining in solution.

3. In the process for the preparation of pentaerythritol which comprises reacting formaldehyde and acetaldehyde in aqueous medium in the presence of an hydroxide of an alkaline-earth metal, the combination of steps comprsing adding ammonium carbonate, stirring, filtering, warming, adding an excess of $H_2O_2$ to destroy the ammonium formate in the filtrate and recovering the polyhydroxy materials remaining in solution.

4. In the process for the preparation of pentaerythritol which comprises reacting formaldehyde and acetaldehyde in aqueous medium in the presence of an hydroxide of an alkaline-earth metal, the combination of steps comprising adding ammonium sulfate, stirring, filtering, warming, adding an excess of $H_2O_2$ to destroy the ammonium formate in the filtrate and recovering the polyhydroxy materials remaining in solution.

5. In the process for the preparation of pentaerythritol which comprises reacting formaldehyde and acetaldehyde in aqueous medium in the presence of calcium hydroxide, the combination of steps comprising adding ammonium carbonate, stirring, filtering, warming, adding an excess of $H_2O_2$ to destroy the ammonium formate in the filtrate and recovering the polyhydroxy materials remaining in solution.

6. In the process for the preparation of pentaerythritol which comprises reacting formaldehyde and acetaldehyde in aqueous medium in the presence of an alkaline-earth metal hydroxide, removing the alkaline-earth metal by precipitation with an ammonium salt whose anion forms an insoluble compound with the alkaline-earth metal and filtering, the step which consists of adding $H_2O_2$ to the filtrate thus obtained to remove the ammonium formate.

JOSEPH A. WYLER.